US010051588B2

(12) United States Patent
Wang et al.

(10) Patent No.: US 10,051,588 B2
(45) Date of Patent: Aug. 14, 2018

(54) COLLABORATIVE OBSS INTERFERENCE MITIGATION FOR WIRELESS COMMUNICATION SYSTEMS

(71) Applicant: MEDIATEK INC., Hsinchu (TW)

(72) Inventors: James June-Ming Wang, San Marino, CA (US); Yuh-Ren Jauh, Taoyuan (TW); Ching-Hwa Yu, Tainan (TW); Chih-Shi Yee, Hsinchu (TW); Yasantha N. Rajakarunanayake, San Ramon, CA (US); Tianyu Wu, Fremont, CA (US)

(73) Assignee: MEDIATEK INC., Hsin-Chu (TW)

( * ) Notice: Subject to any disclaimer, the term of this patent is extended or adjusted under 35 U.S.C. 154(b) by 126 days.

(21) Appl. No.: 14/952,966

(22) Filed: Nov. 26, 2015

(65) Prior Publication Data

US 2016/0157195 A1 Jun. 2, 2016

Related U.S. Application Data

(60) Provisional application No. 62/085,267, filed on Nov. 27, 2014.

(51) Int. Cl.
*H04W 56/00* (2009.01)
*H04W 72/04* (2009.01)
*H04W 72/08* (2009.01)
*H04W 84/12* (2009.01)

(52) U.S. Cl.
CPC ...... *H04W 56/001* (2013.01); *H04W 56/0015* (2013.01); *H04W 72/046* (2013.01); *H04W 72/082* (2013.01); *H04W 84/12* (2013.01)

(58) Field of Classification Search
CPC ..... H04W 88/08; H04W 72/005; H04W 4/00; H04W 72/042; H04W 52/0216; H04W 52/0219; H04W 52/0241; H04W 4/08; H04W 72/082; H04W 74/006; H04W 16/14; H04W 72/0446
See application file for complete search history.

(56) References Cited

U.S. PATENT DOCUMENTS

| | | | | |
|---|---|---|---|---|
| 2010/0069089 | A1* | 3/2010 | Wang | G01S 5/14 455/456.1 |
| 2012/0099470 | A1* | 4/2012 | Li | H04B 7/024 370/252 |
| 2013/0173950 | A1* | 7/2013 | Banerjea | H04J 3/0664 713/503 |

(Continued)

FOREIGN PATENT DOCUMENTS

| | | |
|---|---|---|
| WO | WO2014110397 A1 | 7/2014 |
| WO | WO2014179713 A1 | 11/2014 |

OTHER PUBLICATIONS

EPO, Search Report for the EP patent application 15196722.1 dated Apr. 25, 2016 (7 pages).

*Primary Examiner* — Awet Haile

(57) ABSTRACT

A method of mitigating inter-BSS interference via synchronized inter-BSS operation is proposed. By aligning the transmission of UL and DL transmission in two overlapping OBSSs, the inter-BSS STA-to-STA and inter-BSS AP-to-AP types of interference can be eliminated. Furthermore, based on the BSS overlapping geometry and the STA location, different interference mitigation schemes can be applied to mitigate inter-BSS AP-to-STA and inter-BSS STA-to-AP types of interference.

19 Claims, 6 Drawing Sheets

(56) References Cited

U.S. PATENT DOCUMENTS

| | | | |
|---|---|---|---|
| 2014/0112175 A1 | 4/2014 | Pantelidou et al. | 370/252 |
| 2014/0362840 A1* | 12/2014 | Wong | H04W 88/06 370/338 |
| 2015/0359008 A1 | 12/2015 | Wang et al. | 370/330 |
| 2016/0066198 A1* | 3/2016 | Wang | H04W 16/28 370/338 |
| 2016/0073429 A1* | 3/2016 | Oteri | H04W 74/0816 370/338 |
| 2016/0165630 A1* | 6/2016 | Oteri | H04W 74/04 370/336 |

* cited by examiner

COLLABORATIVE OBSS INTERFERENCE MITIGATION FOR WIRELESS COMMUNICATION SYSTEMS

CROSS REFERENCE TO RELATED APPLICATIONS

This application claims priority under 35 U.S.C. § 119 from U.S. Provisional Application No. 62/085,267, entitled "Collaborative OBSS Interference Mitigation for 11ax," filed on Nov. 27, 2014, the subject matter of which is incorporated herein by reference.

TECHNICAL FIELD

The disclosed embodiments relate generally to wireless network communications, and, more particularly, to OBSS interference mitigation in wireless communication systems.

BACKGROUND

IEEE 802.11 is a set of media access control (MAC) and physical layer (PHY) specification for implementing wireless local area network (WLAN) computer communication in the Wi-Fi (2.4, 3.6, 5, and 60 GHz) frequency bands. The standards and amendments provide the basis for wireless network products using the Wi-Fi frequency bands. For example, IEEE 802.11ac is a wireless networking standard in the 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax was formed and tasked to work on IEEE 802.11ax standard that will become a successor to IEEE 802.11ac.

IEEE 802.11ax is seeking throughput enhancement in the dense deployed environment. Specifically, uplink (UL) and downlink (DL) user aggregation has been introduced to increase network efficiency. UL orthogonal frequency division multiple access (OFDMA) has significantly higher spectral density (narrower bandwidth), which might increase overlapping basic service set (OBSS) interference. For OFDMA and multi-user multiple input and multiple output (MU-MIMO), UL timing synchronization is required and the duration of UL and DL PPDU TX times are controlled by the access point (AP) of each BSS.

For APs deployed in managed network or by carrier operator, it is possible to have AP-AP information exchange. Possible AP-AP information exchange methods may include wired communication between AP-AP such as through Internet or in a wired local network; APs co-located with LTE base stations are connected through the cellular backbone network; and AP-AP connected via wireless link in different bands/channels.

There are different BSS overlapping geometries and hence different types of OBSS interferences. Based on the different OBSS interference types, a solution for OBSS interference mitigation is sought.

SUMMARY

A method of mitigating inter-BSS interference via synchronized inter-BSS operation is proposed. By aligning the transmission of UL and DL transmission in two overlapping OBSSs, the inter-BSS STA-to-STA and inter-BSS AP-to-AP types of interference can be eliminated. Furthermore, based on the BSS overlapping geometry and the STA location, different interference mitigation schemes can be applied to mitigate inter-BSS AP-to-STA and inter-BSS STA-to-AP types of interference.

In one embodiment, a first AP1 serving a first BSS1 performs uplink and downlink timing synchronization with a second AP2 serving a second BSS2 in a wireless communication network. AP1 divides wireless stations (STAB) in BSS1 into a first group and a second group. The transmissions by STAB in the first group do not interfere with AP2 reception. The transmissions by STAB in the second group interfere with AP2 reception. In one example, STA1 in BSS1 and STA2 in BSS2 are both located within an overlapping coverage area of BSS1 and BSS2 and belong to the second group. AP1 coordinates between BSS1 and BSS2 for STAB in BSS1 and BSS2 to communicate based on a group status and a predetermined rule to mitigate interference between BSS1 and BSS2.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
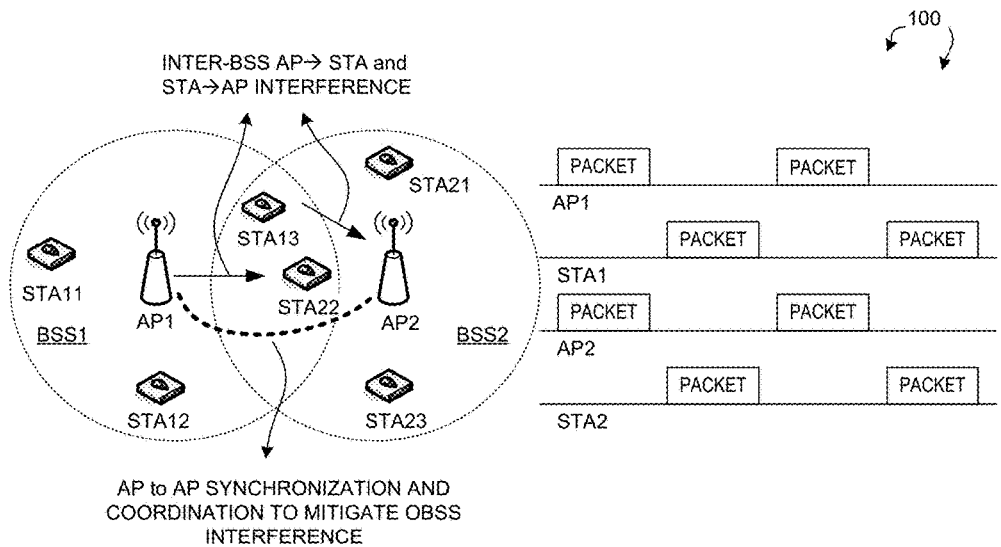
FIG. 1 illustrates a wireless communications network with OBSS interference mitigation in accordance with one novel aspect.

FIG. 1 illustrates a wireless communications network 100 with overlapping basic service set (OBSS) interference mitigation in accordance with one novel aspect. Wireless communications network 100 comprises a first access point AP1 serving a first basic service set BSS1 having a plurality of wireless stations STA11, STA12, and STA13 (collaboratively referred to as STA1). Wireless communications network 100 also comprises a second access point AP2 serving a second basic service set BSS2 having a plurality of wireless stations STA21, STA22, and STA23 (collaboratively referred to as STA2). In the example of FIG. 1, BSS1 and BSS2 are overlapping BSSs (OBSS) having overlapping coverage area. In IEEE 802.11ax, uplink (UL) and downlink (DL) user aggregation has been introduced to increase network efficiency in the dense deployed environment. UL orthogonal frequency division multiple access (OFDMA) has significantly higher spectral density (narrower bandwidth), which might increase inter-BSS interference.

In one novel aspect, mitigation of inter-BSS interference can be achieved via synchronized inter-BSS operation. By aligning the transmission of UL and DL transmission in two OBSSs, the inter-BSS STA→STA and inter-BSS AP→AP types of interference can be eliminated. Based on the BSS overlapping geometry and the STA location, different interference mitigation schemes can be applied to mitigate inter-BSS AP→STA (e.g., AP1→STA22) and inter-BSS STA→AP (e.g., STA13→AP2) types of interference. In the example of FIGS. 1, AP1 and AP2 synchronizes with each other for all the UL and DL packet transmission. As a result, inter-BSS AP1←→AP2 and inter-BSS STA1←→STA2 types of interference are eliminated. Furthermore, for STAB (STA13 and STA22) that are located within the overlapping area of BSS1 and BSS2, AP1 and AP2 coordinate with each other to mitigate inter-BSS AP→STA interference and STAAP interference.

Figure 2:
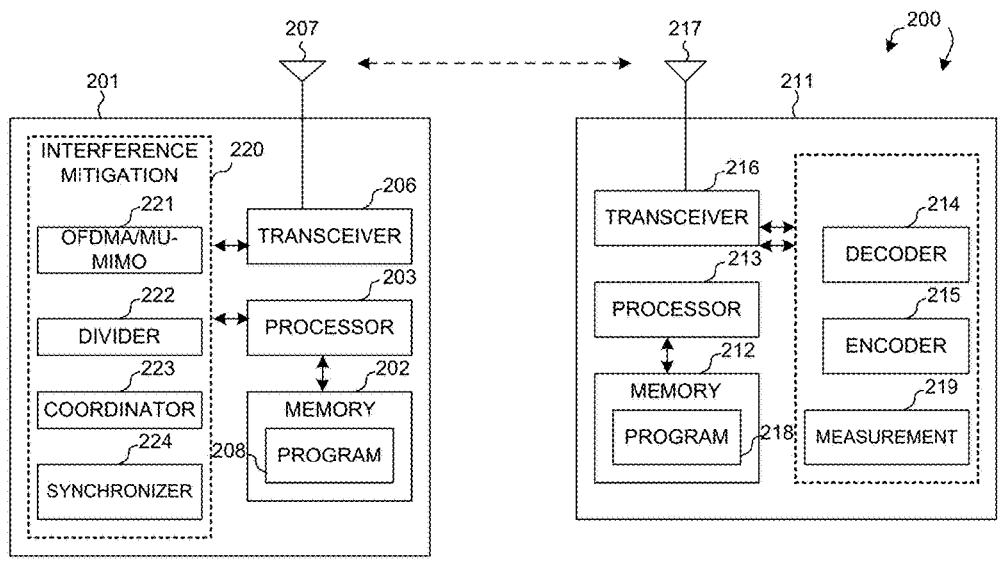
FIG. 2 is a simplified block diagram of a wireless transmitting device and a wireless receiving device in accordance with one novel aspect.

FIG. 2 is a simplified block diagram of wireless stations 201 and 211 in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antennae, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several functional modules and circuits to perform certain embodiments of the present invention. In the example of FIG. 2, wireless device 211 is a wireless communications station (e.g., a non-AP STA) that includes an encoder 204 for encoding and transmitting a frame to device 201, a decoder 205 for receiving and decoding a frame from device 201, and a measurement module 209 for measuring channel qualities and estimating channel conditions. Wireless device 201 is another wireless communications station (e.g., an AP) that includes an OBSS interference mitigation module 220. The OBSS interference mitigation module 220 further comprises an OFDMA/MU-MIMO handler 221 for scheduling uplink OFDMA or MU-MIMO for multiple STAB, a divider 222 for partitioning STAB into groups based on their geographic location, a coordinator 223 for coordinating UL and DL transmission service periods with neighbor APs with overlapping coverages, and a synchronization circuit 224 for performing UL and DL transmission timing synchronization with neighbor APs with overlapping coverages. OBSS interference mitigation module 220 may further comprises sounding and feedback modules for channel state information (CSI) and beamformer and other FDMA/CDMA circuits to mitigate OBSS interference. AP 201 also comprises the functional modules and circuits of a non-AP STA. The different functional modules and circuits can be configured and implemented by software, firmware, and hardware, or any combination thereof. The function modules and circuits, when executed by the processors 203 and 213 (e.g., via executing program codes 208 and 218), allow wireless stations 201 and 211 to perform certain embodiments of the present invention.

Figure 3:
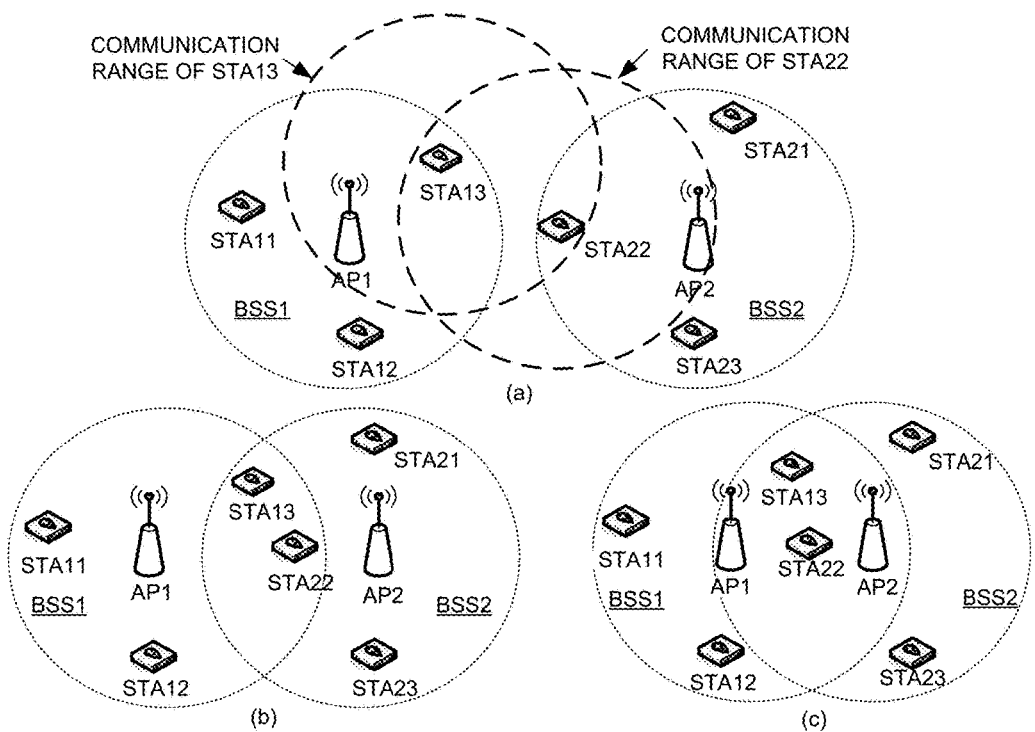
FIG. 3 illustrates three different types of BSS overlapping geometries in a wireless communication system, which includes AP-AP overlap, BSS-BSS overlap, and STA-STA overlap.

FIG. 3 illustrates three different types of BSS overlapping geometries in a wireless communication system, which includes AP-AP overlap, BSS-BSS overlap, and STA-STA overlap. FIG. 3(a) depicts STA-STA overlapping geometry, where the communication range of some STAB overlapping with each other. For example, the communication range of STA13 and the communication range of STA22 overlap with each other. FIG. 3(b) depicts BSS-BSS overlapping geometry, where the coverage of two BSSs overlapping with each other. For example, the coverage of BSS1 and the coverage of BSS 2 overlap with each other. FIG. 3(c) depicts AP-AP overlapping geometry, where the communication range of two BSS APs overlapping with each other. For example, the communication range of BSS1 AP1 and the communication range of BSS2 AP2 overlap with each other. Typically, the level of inter-BSS interference are highest in AP-AP overlap geometry, and lowest in STA-STA geometry. In a managed network, APs are typically deployed in "BSS-BSS overlap" and "STA-STA overlap" geometry or they have completely no overlapping.

Figure 4:
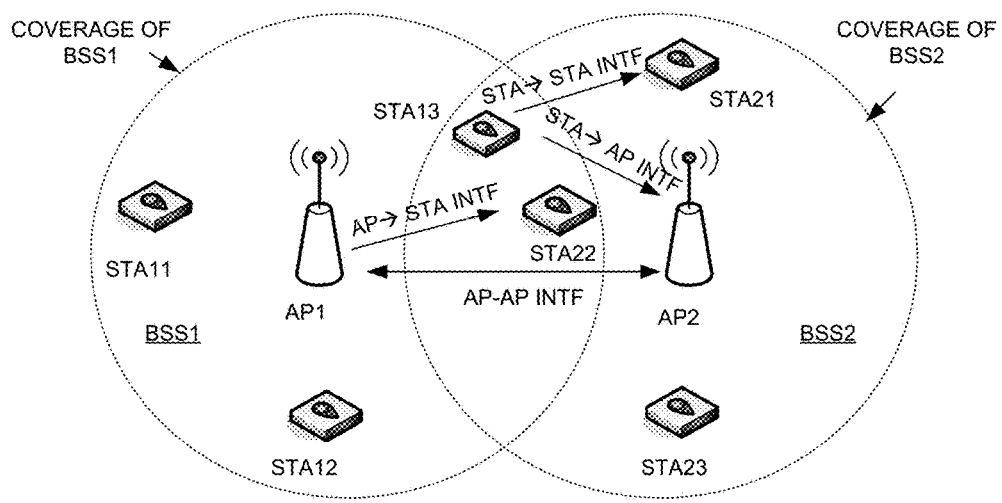
FIG. 4 illustrates four different types of inter-BSS interferences in a wireless communication system, which includes inter-BSS AP-AP interference, inter-BSS STA-STA interference, inter-BSS AP→STA interference, and inter-BSS STA→AP interference.

FIG. 4 illustrates four different types of inter-BSS interferences in a wireless communication system, which includes inter-BSS AP→AP interference, inter-BSS STA→STA interference, inter-BSS AP→STA interference, and inter-BSS STA→AP interference. In a BSS-BSS overlap geometry as depicted by FIG. 4, there are inter-BSS AP→STA interference (e.g., from AP1 to STA22), STA→AP interference (e.g., from STA13 to AP2), and STA→STA interference (e.g., STA13 to STA21). However, there is no inter-BSS AP→AP interference (e.g., from AP1 to AP2 or from AP2 to AP1). In a STA-STA overlap geometry, there is only inter-BSS STA-STA interference.

Figure 5:
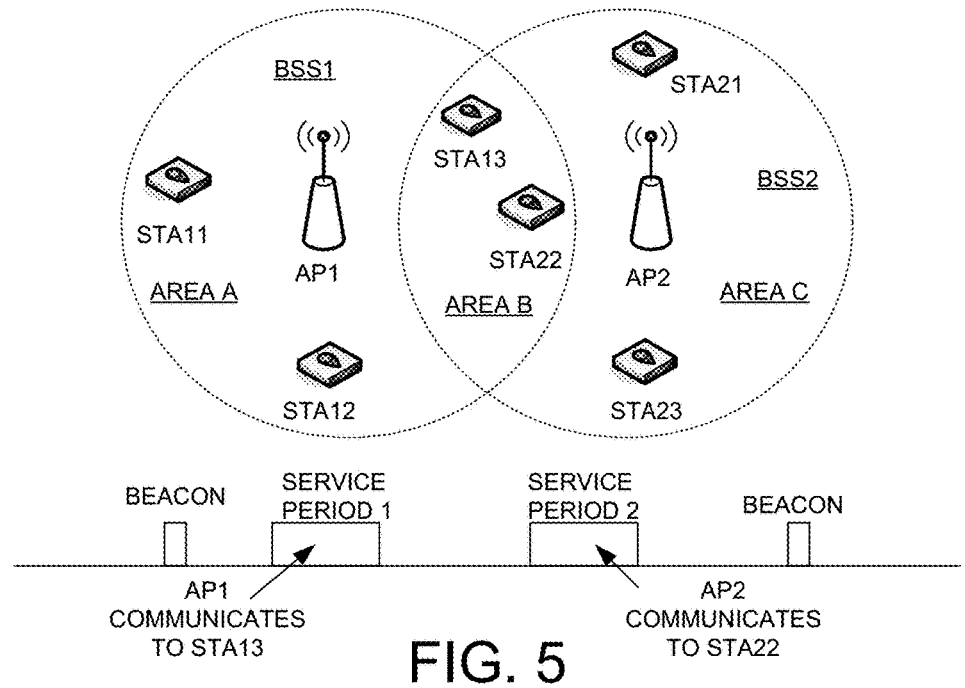
FIG. 5 is a diagram of one embodiment of OBSS interference mitigation, wherein two different APs communicate to its STAB in overlapping coverage area using non-overlapping service periods.

FIG. 5 is a diagram of one embodiment of OBSS interference mitigation, wherein two different APs communicate to its STAB in overlapping coverage area using non-overlapping service periods. In the BSS1-BSS2 overlap geometry as depicted in FIG. 5, an STA can be in one of the three areas: Area A where STAB can only hear AP1 serving BSS1, Area B where STAB can hear both AP1 and AP2, and Area C where STAB can only hear AP2 serving BSS2. AP1 and AP2 reception of UL transmission can be interfered by transmission from OBSS STA in Area B. Similarly, STA reception in Area B can be interfered by transmission from OBSS AP (AP1 or AP2).

In accordance with one novel aspect, to mitigate the OBSS interference, AP1 and AP2 first establish UL and UL synchronization. STA13 or STA22 in Area B reports its list of visible APs and its BSS ID to those visible APs. When AP1 communicates to STAB in Area A and AP2 communicates to STAs in Area C, OBSS interference can be avoided. For communication to STAs in Area B, AP1 and AP2 needs to schedule non-overlapping service periods of BSS1 and BSS2. For example, during service period 1, AP1 communicate to STA13 and BSS2 AP2 keeps quiet during period 1, during service period 2, AP2 communicates to STA22 and BSS1 AP1 keeps quiet during period 2.

Figure 6:
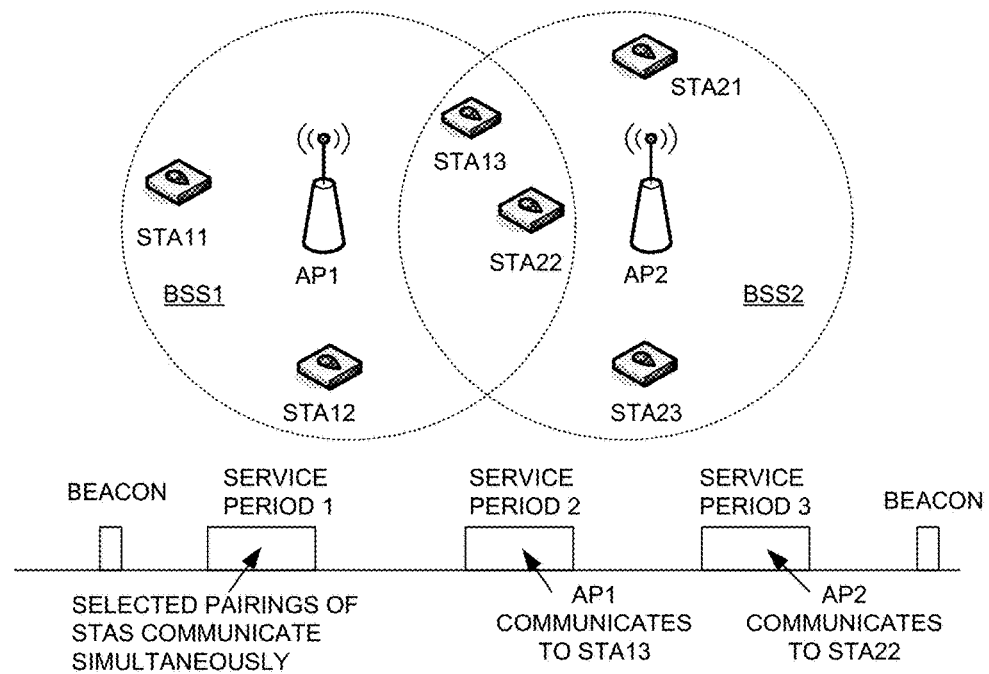
FIG. 6 is a diagram of one embodiment of OBSS interference mitigation, wherein two different APs communicate to selected STAB with good received signal strength in overlapping coverage area using the same service period.

FIG. 6 is a diagram of one embodiment of OBSS interference mitigation, wherein two different APs communicate to selected STAs with good received signal strength in overlapping coverage area using the same service period. In the BSS1-BSS2 overlap geometry as depicted in FIG. 6, an STA can be in one of the three areas: Area A where STAs can only hear AP1 serving BSS1, Area B where STAs can hear both AP1 and AP2, and Area C where STAs can only hear AP2 serving BSS2. AP1 and AP2 reception of UL transmission can be interfered by transmission from OBSS STA in Area B. Similarly, STA reception in Area B can be interfered by transmission from OBSS AP (AP1 or AP2).

In accordance with one novel aspect, to mitigate the OBSS interference, AP1 and AP2 first establish UL and UL synchronization. STA13 or STA22 in Area B reports its list of visible APs and the corresponding received signal strength indicators (RSSIs), and its BSS ID to those visible APs. AP1 and AP2 records RSSIs from STAs (STA13 and STA22) in Area B. When AP1 communicates to STAs in Area A and AP2 communicates to STAs in Area C, OBSS interference can be avoided. For communication to STAs in Area B, AP1 and AP2 selects a number of STA pairings (each pair contains one STA from BSS1 and one STA from BSS2 that have acceptable signal to interference plus noise ratio (SINR) in both UL and UL when this pair of STAB use the medium at the same time) to communication in service period 1. For the rest of STAB in Area B not belonging to the pairing, AP1 and AP2 needs to schedule non-overlapping service periods of BSS1 and BSS2. For example, during service period 2, AP1 communicate to STA13 and BSS2 AP2 keeps quiet during period 2, during service period 3, AP2 communicates to STA22 and BSS1 AP1 keeps quiet during period 3.

Figure 7:
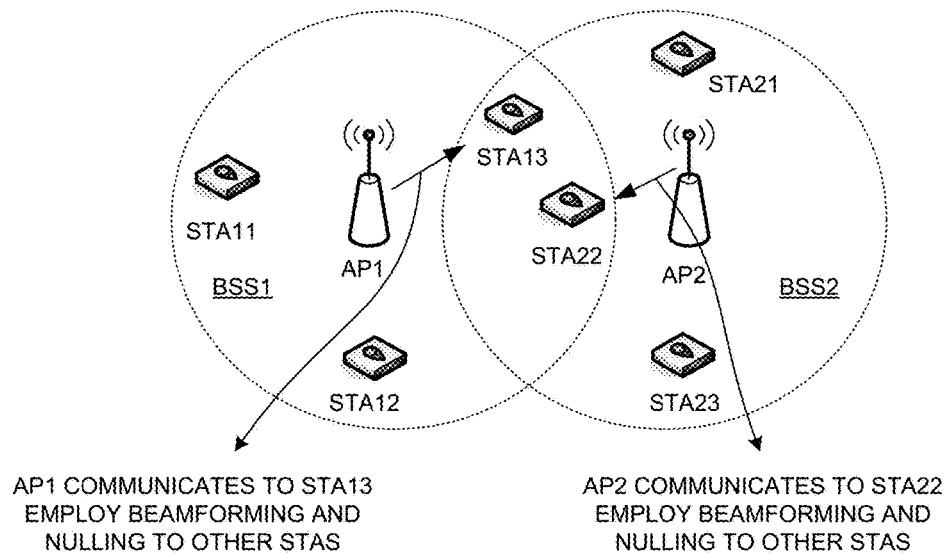
FIG. 7 is a diagram of one embodiment of OBSS interference mitigation, wherein an AP communicates with its STAB employing beamforming while nulls to other STAB in overlapping coverage area.

FIG. 7 is a diagram of one embodiment of OBSS interference mitigation, wherein an AP communicates with its STAB employing beamforming while nulls to other STAB in overlapping coverage area. The BSS1-BSS2 overlap geometry depicted in FIG. 7 is similar to FIG. 5 and FIG. 6. To mitigate the OBSS interference, AP1 and AP2 first establish UL and UL synchronization. STA13 or STA22 in Area B reports its list of visible APs and its BSS ID to those visible APs. AP1 and AP2 both perform sounding and feedback with STAB in Area B to obtain channel state information (CSI) and derive precoding matrix (beamforming weights). When AP1 communicates to STAB in Area A and AP2 communicates to STAB in Area C, OBSS interference can be avoided. For communication to STAB in Area B, AP1 employs beamforming to transmit to the STAB in BSS1 while nulls to the STAB in BSS2. AP2 employs beamforming to transmit to the STAB in BSS2 while nulls to the STAB in BSS1. Note that simultaneous beamforming and nulling can be obtained using the precoding matrix as in the DL MU-MIMO. Precoding matrix allows a spatial stream to be transmitted (beamformed to) one STA while nulls to other STAB. Each AP needs to inform the other AP which STA to communicate to in advance (either through back channel such as wired link or other means). Both APs could select a service period to communicate to STAB in Area B.

Figure 8:
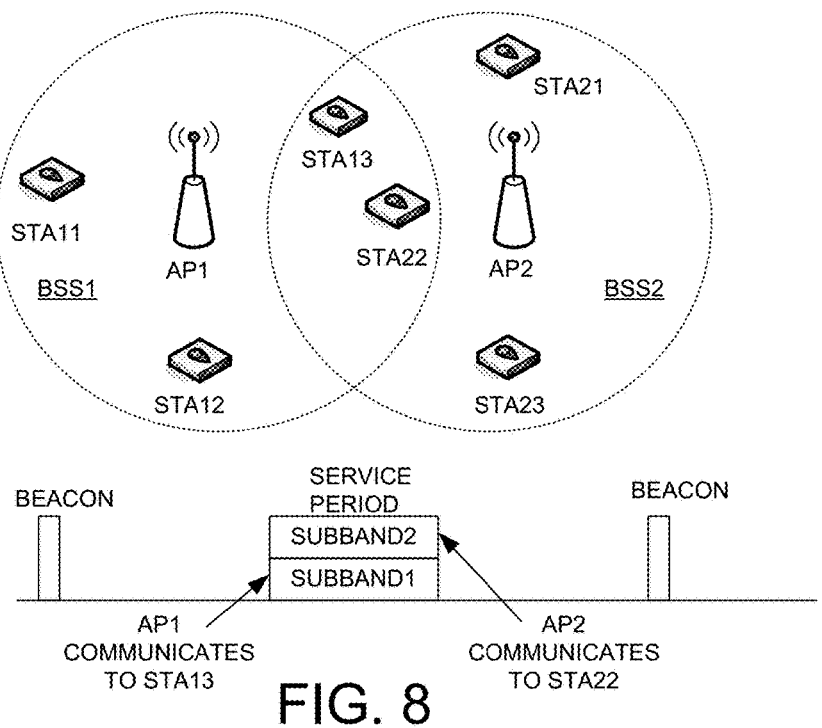
FIG. 8 is a diagram of one embodiment of OBSS interference mitigation, wherein two different APs communicate to its STAB over different sub-channel using the same service period.

FIG. 8 is a diagram of one embodiment of OBSS interference mitigation, wherein two different APs communicate to its STAB over different sub-channel using the same service period. The BSS1-BSS2 overlap geometry depicted in FIG. 8 is similar to FIG. 5 and FIG. 6. In this embodiment, AP1 communicates to STAB in Area A and AP2 communicates to STAB in Area C freely with any bandwidth restriction. For communications to STAB in Area B, AP1 communicates to STAB in Area B (STA13) using sub-channel 1, while AP2 communicates to STAB in Area B (STA22) using sub-channel 2. Sub-channel 1 and sub-channel 2 are not overlapping. AP1 can optionally send to STA in Area A using sub-channel 2 at the same time that it transmits to STA in Area B. For example, AP1 chooses beamforming (BF) pattern for sub-channel 2 that has good CSI for STA in Area A and properly null for Area B. Assume that STA13 has reported that STA22 is its nearby interference STA using sub-band 2, or AP1 has other method to obtain such information. AP1 also needs to obtain the CSI result of STA11 and STA13 for several BF pattern in sub-band 2 (amplitude info). AP1 might be able to generate these results from one CSI feedback and apply BF pattern to get the expected CSI response. Similarly, AP2 can optionally send to STA in Area C using sub-channel 1 at the same time that it transmits to STA in area B. In an alternative embodiment, other methods such as employing different spread codes (CDMA) can be used.

There are different methods for performing UL and DL timing synchronization for IEEE 802 wireless networks. Please refer to "IEEE Std. P802.1AS", IEEE Standard for Local and Metropolitan Area Networks—Timing and Synchronization for Time-Sensitive Applications; the contents are incorporated herein by in entirety. In the precision timing standard 802.1AS in which Nano-second scale timing information to propagate over an 802.1 network (Ethernet switches and hubs) so that ports can be synchronized. The respective AP (BSS) can then use this network time to synchronize their own clocks—and thus their own TSF. This will enable beacon intervals and UL and DL transmission timing or other timing related information of these OBSSs to participate in the mechanism described in the current invention. In 802.11ax, UL aggregation (UL MU-MIMO and UL OFDMA) starts with AP transmitting trigger frame carried STA IDs and UL PPDU transmit duration. When AP knows the neighbor's AP DL and UL transmission duration, it can synchronize the DL/UL transmission in its BSS by using the same DL transmission duration and setting the same UL PPDU transmit duration in the trigger frame, allowing its UL STA's transmission to end at the same time as its neighbor BSS. The information of the DL and UL transmission duration can be exchanged or distributed among neighboring BSSs.

In an alternate embodiment, for OBSS APs to establish UL and DL timing synchronization, the following method can be used. First, select one AP (AP1 in BSS1) as the timing master and one AP (AP2 in BSS2) as the timing slave. STAB in BSS1 and BSS2 report the observed OBSS APs to their own AP. APs also observe the OBSS STAB in range. Next, AP1 indicates synchronization operation when it transmits to STAB in area B. In the simplest synchronization operation, AP1 uses the fixed TX time for its subsequent DL transmission and assign fixed TX time to STA's UL transmission. STAB belong to BSS1 in area B signals the synchronizing operation and UL and DL TX times to OBSS AP, and OBSS AP can also observe the STA transmission in area B to figure out the UL and DL TX times. AP2 then adjusts the subsequent UL and DL start time to synchronize to BSS1. Note AP2 adjusts the start time of UL and DL by increasing or decreasing UL and DL TX times. Note that more flexible UL and DL TX time is allowed (instead of fixed TX time) in BSS1 as long as the TX times are communicated to AP2 in advance. The communication between AP1 and AP2 can be via a back channel (wired channel, different wireless networks, etc.) instead of via STAB in Area B. Method of selecting timing master and slave are vendor specific or beyond the scope of this invention. It can also depend on which BSS is transmitting to the medium first.

Figure 9:
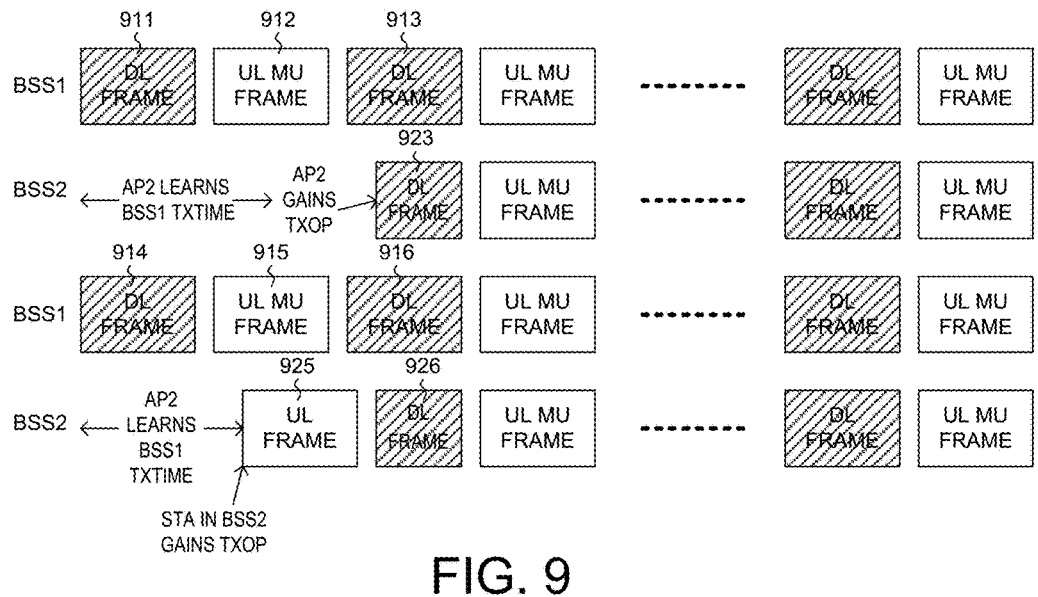
FIG. 9 illustrates one example of synchronized inter-BSS operation by adjusting end of DL frames of two overlapping BSSs.

FIG. 9 illustrates examples of synchronized inter-BSS operation by adjusting end of DL frames of two overlapping BSSs. In the examples of FIG. 9, AP1 of BSS1 is the timer master and AP2 of BSS2 is the timer slave. In the simplest synchronization operation, AP1 uses the fixed TX time for its subsequent DL transmission and assign fixed TX time to STA's UL transmission as depicted. In a first example, AP2 learns the BSS1 TX time during DL frame 911 and UL MU frame 912. AP2 then gains TXOP for DL frame 923. AP2 adjusts DL frame 923 TX time such that the end of DL frame 913 in BSS1 and the end of DL frame 923 in BSS2 are the same. As a result, the subsequent UL and DL transmissions of BSS1 and BSS2 are synchronized. In a second example, AP2 learns the BSS1 TX time during DL frame 914 and UL MU frame 915. STA2 then gains TXOP for UL frame 925, which is followed by DL frame 926. AP2 adjusts DL frame 926 TX time such that the end of DL frame 916 in BSS1 and the end of DL frame 926 in BSS2 are the same. As a result, the subsequent UL and DL transmissions of BSS1 and BSS2 are synchronized.

Figure 10:
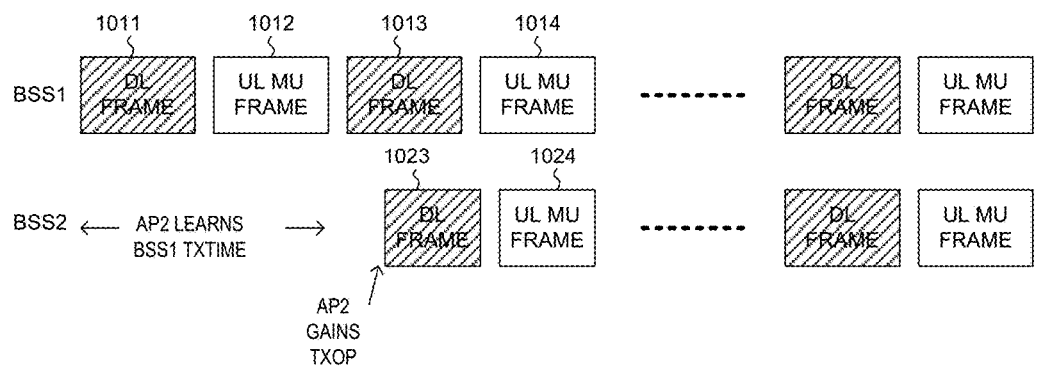
FIG. 10 illustrates another example of synchronized inter-BSS operation by adjusting end of UL frames of two overlapping BSSs.

FIG. 10 illustrates another example of synchronized inter-BSS operation by adjusting end of UL frames of two overlapping BSSs. In the example of FIG. 10, AP1 of BSS1 is the timer master and AP2 of BSS2 is the timer slave. In the simplest synchronization operation, AP1 uses the fixed TX time for its subsequent DL transmission and assign fixed TX time to STA's UL transmission as depicted. AP2 learns the BSS1 TX time during DL frame 1011 and UL MU frame 1012. AP2 then gains TXOP for DL frame 1023, which is followed by UL MU frame 1024. Instead of adjusting DL frame 1023, AP2 adjusts UL MU frame 1024 TX time such that the end of UL MU frame 1014 in BSS1 and the end of UL MU frame 1024 in BSS2 are the same. As a result, the subsequent UL and DL transmissions of BSS1 and BSS2 are synchronized.

Figure 11:
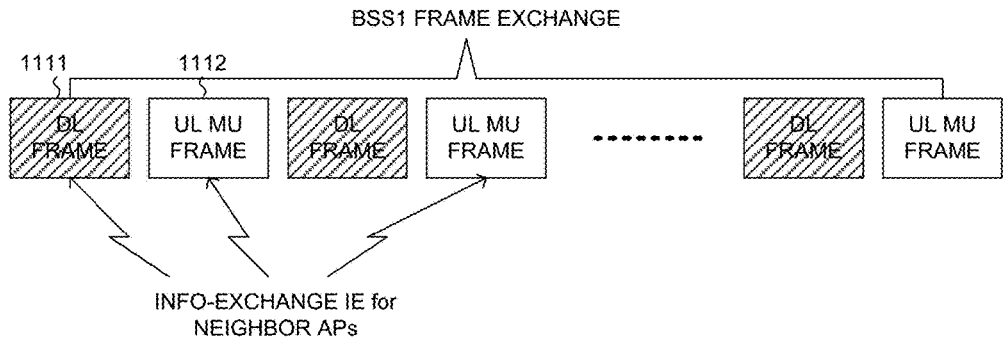
FIG. 11 illustrates one embodiment of a synchronization method between two APs serving two overlapping BSSs.

FIG. 11 illustrates one embodiment of a synchronization method between two APs (AP1 and AP2) serving two overlapping BSSs (BSS1 and BSS2). AP1 communicates to STAB in Area B, which has visibility to both AP1 and AP2. An STA belongs to BSS1 in Area B signals the synchronization operation and UL and DL TX times to AP2. For example, AP1 can signal information to AP2 via the STA by piggy backing (e.g., using an inter-BSS information exchange IE) on the DL frame 1111 or the UL MU frame 1112.

Figure 12:
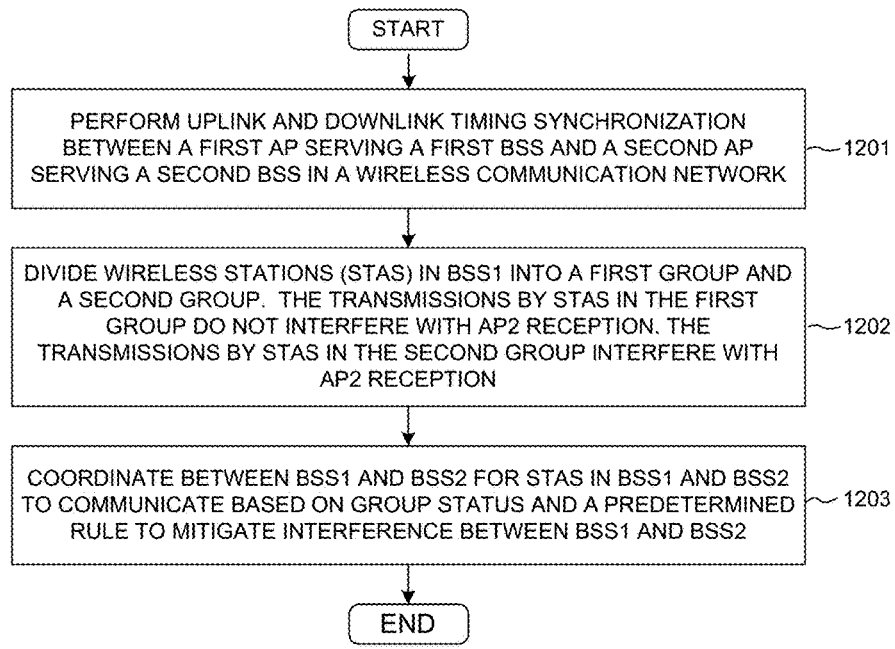
FIG. 12 is flow chart of a method of OBSS mitigation in accordance with one novel aspect.

FIG. 12 is flow chart of a method of OBSS mitigation in accordance with one novel aspect. In step 1201, a first AP1 serving a first BSS1 performs uplink and downlink timing synchronization with a second AP2 serving a second BSS2 in a wireless communication network. In step 1202, AP1 divides wireless stations (STAB) in BSS1 into a first group and a second group. The transmissions by STAB in the first group do not interfere with AP2 reception. The transmissions by STAB in the second group interfere with AP2 reception. In one example, STA1 in BSS1 and STA2 in BSS2 are both located within an overlapping coverage area of BSS1 and BSS2 and belong to the second group. In step 1203, AP1 coordinates between BSS1 and BSS2 for STAB in BSS1 and BSS2 to communicate based on group status and a predetermined rule to mitigate interference between BSS1 and BSS2.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of wireless communication, the method comprising:

at a first access point (AP) serving a first basic service set (BSS), obtaining first information that identifies a second AP serving a second BSS, wherein said first BSS and said second BSS have an overlapping coverage area;

receiving second information from non-AP STAs located within said overlap coverage area, wherein said second information identifies one or more APs visible to said non-AP STAs and corresponding received signal strength indicators thereof, and wherein further said one or more APs comprise said second AP;

based on said second information, selecting, from said non-AP STAs located within said overlap coverage area, a first set of selected non-AP STAs respectively associated with said first AP and said second AP and a second set of selected non-AP STAs respectively associated with said first AP and said second AP;

assigning a same service period for said first set of selected non-AP STAs for simultaneous communication; and assigning non-overlapping service periods to said second set of selected non-AP STA.

2. The method of claim 1, further comprising:

generating a synchronization indication;

using a first transmission time for a downlink (DL) frame transmitted from said first AP to a first non-AP station (STA), wherein said first non-AP STA is associated with said first BSS and located in said overlapping coverage area; and assigning a second transmission time for an uplink (UL) frame transmitted from said first non-AP STA to said first AP, wherein said synchronization indication is operable to cause said second AP to, based on said first transmission time and said second transmission time, synchronize with said first AP by performing one or more of:

aligning an end time of a DL frame transmitted from said second AP with an end time of a DL frame transmitted from said first AP; and aligning an end time of a UL frame transmitted to said second AP with an end time of an UL frame transmitted to said first AP, wherein said alignings are performed by said second AP adjusting a start time of said DL frame transmitted from said second AP or adjusting a start time of said UL frame transmitted to said second AP.

3. The method of claim 2, wherein said alignings are performed by said second AP increasing or decreasing one of: a transmission time of said UL frame transmitted to said second AP and a transmission time of said DL frame transmitted from said second AP.

4. The method of claim 2, wherein said first transmission time and said second transmission time are fixed for subsequent UL frames transmitted to said first AP and for subsequent DL frames transmitted from said first AP, respectively.

5. The method of claim 2 further comprising informing said second AP of: first transmission times for subsequent UP frames transmitted to said first AP; and second transmission times for subsequent DL frames transmitted from said first AP, wherein said first transmission times and said second transmission times are unfixed.

6. The method of claim 2 further comprising transmitting said synchronization indication to said first non-AP STA, wherein said synchronization indication is further transmitted to said second AP from said first non-AP STA.

7. The method of claim 2, wherein said first AP is designated as a master AP, and wherein further said second AP is designated as a slave AP.

8. The method of claim 1 further comprising:
assigning a first service period for said first AP to communicate with one or more non-AP STAs located in said overlap coverage area; and
assigning a second service period for said second AP to communicate with one or more non-AP STAs located in said overlap coverage area, wherein said first service period and said second service period are non-overlapping.

9. The method of claim 1 further comprising using beamforming to transmit to said first non-AP STA and nulling to a second non-AP STA associated with said second BSS, wherein said nulling is based on a precoding matrix.

10. The method of claim 1 further comprising:
obtaining information indicating that a first subband used by said second AP causes signal interference with said first non-AP STA;
selecting a beamforming pattern for said first subband based on channel state information (CSI) of a second non-AP STA that is associated with said first BSS and outside said overlapping coverage area, wherein said beamforming pattern nulls to said first non-AP STA;
communicating with said first non-AP using a second subband, wherein said first subband and said second subband are non-overlapping, and
communicating with said second non-AP STA using said first subband with said beamforming pattern.

11. An access point (AP) device comprising:
a memory;
a processor coupled to said memory; and
interference mitigation logic, wherein said AP device is operable to serve a first basic service set, wherein said interference mitigation logic is configured to:

obtain first information that identifies a second AP device serving a second BSS, wherein said first BSS and said second BSS have an overlapping coverage area;
generate a synchronization indication;
use a first transmission time for a downlink (DL) frame transmitted from said AP device to a first non-AP station (STA), wherein said first non-AP STA is associated with said first BSS and located in said overlapping coverage area; and
assign a second transmission time for an uplink (UL) frame transmitted from said first non-AP STA to said AP device,
wherein said synchronization indication is operable to cause said second AP device to, based on said first transmission time and said second transmission time, synchronize with said AP device by performing one or more of:
aligning an end time of a DL frame transmitted from said second AP device with an end time of a DL frame transmitted from said AP device; and
aligning an end time of a UL frame transmitted to said second AP device with an end time of an UL frame transmitted to said AP device,
wherein said synchronization indication is operable to cause said second AP device to increase or decrease one of: a transmission time of said UL frame transmitted to said second AP device and a transmission time of said DL frame transmitted from said second AP device.

12. The AP device of claim 11, wherein said synchronization indication is operable to cause said second AP device to adjust a start time of said DL frame transmitted from said second AP device or adjust a start time of said UL frame transmitted to said second AP device.

13. The AP device of claim 11, wherein said first transmission time and said second transmission time are fixed for subsequent UL frames transmitted to said AP device and for subsequent DL frames transmitted from said AP device, respectively.

14. The AP device of claim 11, wherein said interference mitigation logic is further configured to inform said second AP device of: first transmission times for subsequent UP frames transmitted to said AP device; and second transmission times for subsequent DL frames transmitted from said AP device, wherein said first transmission times and said second transmission times are varied.

15. The AP device of claim 11, wherein said interference mitigation logic is further configured to:
assign a first service period for said AP device to communicate with one or more non-AP STAs located in said overlapping coverage area;
assign a second service period for said second AP device to communicate with one or more non-AP STAs located in said overlapping coverage area, wherein said first service period and said second service period are non-overlapping.

16. The AP device of claim 11, wherein said interference mitigation logic is further configured to:
receive second information from non-AP STAs located within said overlapping coverage area, wherein said second information identifies one or more APs visible to said non-AP STAs and corresponding received signal strength indicators thereof, and wherein further said one or more APs comprise said second AP device;
based on said second information, select, from said non-AP STAs located within said overlap coverage area, a set of selected non-AP STAs respectively associated with said AP device and said second AP device;

assign a same service period for said set of selected non-AP STAs for simultaneous communication; and assign non-overlapping service periods to non-AP STAs outside said set of selected non-AP STAs.

17. The AP device of claim 11, wherein said interference mitigation logic is further configured to use beamforming to transmit to said first non-AP STA and to null to a second non-AP STA associated with said second BSS, wherein nulling to said second non-AP STA is based on a precoding matrix.

18. The AP device of claim 11, wherein said interference mitigation logic is further configured to:

obtain information indicating that a first subband used by said second AP causes signal interference with said first non-AP STA;

select a beamforming pattern for said first subband based on channel state information (CSI) of a second non-AP STA that is associated with said first BSS and outside said overlapping coverage area, wherein said beamforming pattern nulls to said first non-AP STA;

communicate with said first non-AP using a second subband, wherein said first subband and said second subband are non-overlapping; and communicate with said second non-AP STA using said first subband with said beamforming pattern.

19. A method of wireless communication, the method comprising:

at a first AP serving a first basic service set (BSS), obtaining information indicating that a first subband used by a second AP causes interference with a first non-AP STA associated with said first BSS, wherein said second AP serves a second BSS, wherein said first BSS and said second BSS have an overlap coverage area, and wherein further said first non-AP STA is located within said overlapping coverage area;

selecting a beamforming pattern for said first subband based on channel state information (CSI) of said first non-AP STA and a second non-AP STA that is associated with said first BSS and outside said overlapping coverage area, wherein said beamforming pattern nulls to said first non-AP STA;

communicating with said first non-AP STA using a second subband, wherein said first subband and said second subband are non-overlapping; and communicating with said second non-AP STA using said first subband with said beamforming pattern.

* * * * *